(12) United States Patent
Morrow et al.

(10) Patent No.: US 12,011,688 B2
(45) Date of Patent: Jun. 18, 2024

(54) LANDFILL GAS PROCESSING SYSTEMS AND METHODS

(71) Applicant: Morrow Renewables, LLC, Midland, TX (US)

(72) Inventors: Luke N. Morrow, Fairview, TX (US); Paul L. Rogers, McKinney, TX (US)

( * ) Notice: Subject to any disclaimer, the term of this patent is extended or adjusted under 35 U.S.C. 154(b) by 601 days.

(21) Appl. No.: 17/315,496

(22) Filed: May 10, 2021

(65) Prior Publication Data

US 2022/0355246 A1 Nov. 10, 2022

(51) Int. Cl.
| | | |
|---|---|---|
| *B01D 53/75* | (2006.01) | |
| *B01D 53/14* | (2006.01) | |
| *B01D 53/18* | (2006.01) | |
| *B01D 53/78* | (2006.01) | |

(52) U.S. Cl.
CPC ......... *B01D 53/75* (2013.01); *B01D 53/1437* (2013.01); *B01D 53/1475* (2013.01); *B01D 53/1487* (2013.01); *B01D 53/18* (2013.01); *B01D 53/78* (2013.01); *B01D 53/1425* (2013.01); *B01D 2257/504* (2013.01); *B01D 2257/7025* (2013.01)

(58) Field of Classification Search
CPC ............... B01D 53/75; B01D 53/1437; B01D 53/1475; B01D 53/1487; B01D 53/18; B01D 53/78; B01D 53/1425; B01D 2257/504; B01D 2257/7025; B01D 53/62; B01D 2256/245; B01D 2257/304; B01D 2257/702; B01D 53/1406; C10L 2290/06; C10L 2290/46; C10L 2290/48; C10L 2290/541; C10L 3/104; C10L 2290/26; C10L 2290/545; Y02E 50/30

See application file for complete search history.

(56) References Cited

U.S. PATENT DOCUMENTS

| | | | |
|---|---|---|---|
| 2,982,721 | A | 5/1961 | Dow |
| 3,121,624 | A | 2/1964 | Matsch |
| 3,469,934 | A | 9/1969 | Bocard |
| 3,618,331 | A | 11/1971 | Smith |
| 3,767,766 | A | 10/1973 | Tjoa et al. |
| 4,000,990 | A | 1/1977 | Bingham |

(Continued)

OTHER PUBLICATIONS

Sherman; Morphysorb Process Application for Landfill Gas; IGT Analytical Report; Apr. 23, 1999; Des Plaines, IL.

(Continued)

*Primary Examiner* — Dung H Bui
(74) *Attorney, Agent, or Firm* — bob,harter.com; Robert J. Harter

(57) ABSTRACT

A gas processing system for recovering methane gas from a landfill includes a high pressure main absorber plus a relatively low pressure one. The low pressure absorber receives a gas stream from an equally low pressure flash tank. This low pressure gas stream consists mostly of carbon dioxide and methane. The methane would normally be lost due to the high cost of recompressing the carbon dioxide, but by running this mixture of carbon dioxide and methane through the low pressure absorber with a slip stream of cold absorbent, a large portion of the carbon dioxide can be removed with negligible methane losses. The remaining methane can be recycled through the high pressure main absorber without having to recompress the removed portion of carbon dioxide.

16 Claims, 4 Drawing Sheets

(56) References Cited

U.S. PATENT DOCUMENTS

| | | |
|---|---|---|
| 4,080,424 A | 3/1978 | Miller et al. |
| 4,097,250 A | 6/1978 | Pagani |
| 4,242,108 A | 12/1980 | Nicholas et al. |
| 4,270,937 A | 6/1981 | Adler et al. |
| 4,318,723 A | 3/1982 | Holmes |
| 4,371,381 A | 2/1983 | Schuftan |
| 4,417,449 A | 11/1983 | Hegarty et al. |
| 4,449,994 A | 5/1984 | Hegarty |
| 4,459,142 A | 7/1984 | Goddin |
| 4,475,347 A | 10/1984 | Hegarty |
| 4,478,798 A | 10/1984 | Karwat |
| 4,491,566 A | 1/1985 | Adams et al. |
| 4,518,399 A | 5/1985 | Croskell |
| 4,548,620 A | 10/1985 | Albiol |
| 4,563,202 A | 1/1986 | Yao |
| 4,575,387 A | 3/1986 | Larue |
| 4,609,384 A | 9/1986 | Ranke |
| 4,675,035 A | 6/1987 | Apffel |
| 4,681,612 A | 7/1987 | O'Brien |
| 4,720,294 A | 1/1988 | Lucadamo |
| 4,747,858 A | 5/1988 | Gottier |
| 4,749,555 A | 6/1988 | Bush |
| 4,762,543 A | 8/1988 | Pantermuehl |
| 4,770,676 A | 9/1988 | Sircar |
| 4,869,894 A | 9/1989 | Wang |
| 5,059,405 A | 10/1991 | Watson |
| 5,198,001 A | 3/1993 | Knebel |
| 5,335,504 A | 8/1994 | Durr |
| 5,451,249 A | 9/1995 | Spiegel |
| 5,453,210 A | 9/1995 | Bardasz |
| 5,529,612 A | 6/1996 | Troost |
| 5,642,630 A | 7/1997 | Abdelmalek et al. |
| 5,664,911 A | 9/1997 | Bridges |
| 5,681,360 A | 10/1997 | Siwajek et al. |
| 5,842,357 A | 12/1998 | Siwajek |
| 5,938,819 A | 8/1999 | Seery |
| 5,961,701 A | 10/1999 | Hlynsky |
| 6,071,326 A | 6/2000 | Hall |
| 6,183,540 B1 * | 2/2001 | Thonsgaard ....... B01D 53/1487 95/193 |
| 6,666,908 B2 | 12/2003 | Cadours et al. |
| 6,929,680 B2 | 8/2005 | Krushnevych et al. |
| 6,945,029 B2 | 9/2005 | Viteri |
| 6,969,562 B2 | 11/2005 | Su et al. |
| 7,699,914 B1 | 4/2010 | Morrow et al. |
| 8,250,000 B2 | 8/2012 | Ogg |
| 8,282,899 B2 | 10/2012 | Bahr et al. |
| 8,287,625 B2 | 10/2012 | Casella |
| 8,518,155 B2 | 8/2013 | Palamara et al. |
| 8,696,798 B2 | 4/2014 | Mak |
| 8,840,708 B1 | 9/2014 | Morrow et al. |
| 9,340,739 B1 * | 5/2016 | Morrow ............ B01D 53/1475 |
| 9,382,492 B1 | 7/2016 | Morrow et al. |
| 9,580,369 B2 | 2/2017 | Morrow et al. |
| 2009/0241773 A1 * | 10/2009 | Lechnick .................. C10L 3/10 95/44 |
| 2009/0241778 A1 | 10/2009 | Lechnick et al. |
| 2013/0055895 A1 | 3/2013 | Menzel |

OTHER PUBLICATIONS

Dinsmore; High BTU Lanfill Gas Recovery Using Pressure Swing MDEA Process; Published Paper; Aug. 18, 1998; John Zink Company; Tulsa, OK.

Koch; A New Process for the Production of Hight BTU Gas; Published Paper; Aug. 18, 1998; Air Products and Chemicals, Inc.; Allentown, PA.

Shah; Selexol Solvent Landfill Gas Treating Unit Process Design Infrormation Package; Evaluation Report; Dec. 12, 1996; Process Design Services, Inc.; Akron, OH.

Wheless; Production and Utilization of Landfill Gas Derived CNG in Heavy-Duty Class 8 Trucks; Published Paper; Nov. 1996; TOPTEC; Costa Mesa, CA.

Cosulich; Converting Landfill Gas to Vehicle Fuel; Article; Jan. 1996; Natural Gas Fuels; RP Publishing; Denver, CO.

Wheless; Trash is Your Friend; Article; May 1996; Natural Gas Fuels; RP Publishing; Denver, CO.

Wehless; Converting Landfill Gas to Vehicle Fuel; Article; Jan. 1996; Natural Gas Fuels; RP Publishing; Denver CO.

Epps; Use of Selexol Solvent for Hydrocarbon Dewpoint Control and Dehydration of Natural Gas; Presentation; Feb. 28, 1994; Norman, OK.

Maguin; Processing and Utilization of Landfill Gas as a Clean Alternative Vehicle Fuel; Paper describing facility installation; Oct. 1993; Whittier CA.

Epps; Processing of Landfill Gas for Commercial Applications; Presentation; Jun. 15, 1992; Union Carbide Chemicals and Plastics Technology Corp., Houston, TX.

Bucklin; Comparison of Fluor Solvent and Selexol Processes; AlChe Symposium; Mar. 11, 1984; AlChe; Atlanta, GA.

Judd; Gas-Process-Plant Conversion Cuts Energy Use, Emissions; Article; Oil and Gas Journal; May 8, 1978; Pennwell Publishing; Tulsa, OK.

Raney; Bulk Removal of Carbon Dioxide with Selexol at Pikes Peak Plant; Paper describing facility installation; Feb. 15, 1974; Dallas, TX.

* cited by examiner

LANDFILL GAS PROCESSING SYSTEMS AND METHODS

FIELD OF THE DISCLOSURE

This patent generally pertains to processing landfill gas and more specifically to systems and methods for recovering methane from landfill gas.

BACKGROUND

Decomposing waste buried in a landfill can generate landfill gas that can be extracted and processed to provide valuable methane gas of varying degrees of purity and energy content. Processing plants have been developed for recovering and purifying methane gas, but there continues to be a need for better systems and methods.

DETAILED DESCRIPTION

Figure 1:
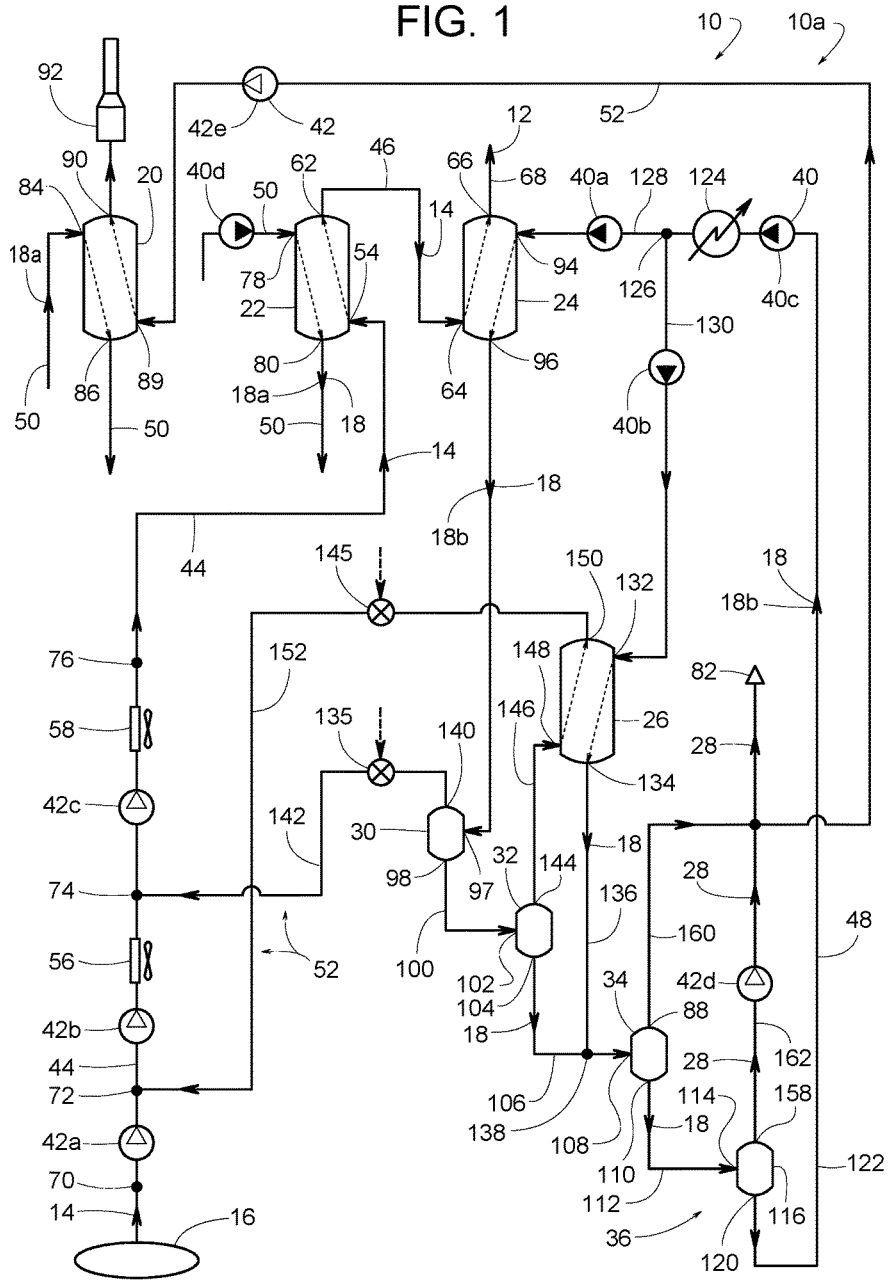
FIG. 1 is a schematic diagram of an example gas processing system constructed in accordance with the teachings disclosed herein.

FIGS. 1-4 show various examples of a gas processing system 10 (e.g., systems 10a, 10b, 10c and 10d) for recovering methane gas 12 from a mixture of gases 14 drawn from a landfill 16. Landfill 16 is a large field of buried garbage with a series of wells that tap the landfill gas 14 produced by the decomposing garbage. In addition to methane 12, the mixture of gases 14 includes various other gases and impurities. Examples of such gases and impurities include $CO_2$ (carbon dioxide), air, hydrocarbons, $H_2S$ (hydrogen sulfide), aromatics and water.

In the example shown in FIG. 1, gas processing system 10 circulates a solvent 18 through a pretreat stripper 20, a preabsorber 22, a main absorber 24, and an intermediate absorber 26. Solvent 18 represents any chemical that can absorb and subsequently release one or more impurities that can contaminate methane gas. Some examples of solvent 18 include, SELEXOL (registered trademark of Union Carbide Chemicals & Plastics Technology Corporation of The Dow Chemical Company) and DEPG (dimethyl ethers of polyethylene glycol).

In some examples, gas processing system 10 has two charges of solvent 18 that are isolated from each other. In some examples, a pretreatment solvent 18a circulates between pretreat stripper 20 and preabsorber 22, and a main solvent 18b circulates between main absorber 24 and intermediate absorber 26. Main solvent 18b and pretreatment solvent 18a are examples of solvent 18. In some examples, pretreatment solvent 18a and main solvent 18b are the same type of solvent. In other examples, pretreatment solvent 18a is different from main solvent 18b.

To release and recycle methane 14 that was absorbed by the solvent 18b in the main absorber 24, some examples of gas processing system 10 include a first flash tank 30 at a first pressure (e.g., 200 psig) and a second flash tank 32 at a second pressure (e.g., 100 psig). To release carbon dioxide 28 from the solvent 18b and thereby regenerate the solvent 18b, some examples of gas processing system 10 include a third flash tank 34 at a third pressure (e.g., atmospheric pressure) and a vacuum circuit 36 operating at a subatmospheric pressure (e.g., −12 psig).

Various liquid pumps 40 (e.g., positive displacement pumps, centrifugal pumps, etc.) and gas compressors 42 (e.g., centrifugal compressors, screw compressors, Roots blowers, vacuum pumps, turbines, etc.) can be used for circulating gas and liquids at certain pressures through gas processing system 10. In the illustrated example, gas processing system 10 includes a main pump 40a, a secondary pump 40b, a booster pump 40c, and a pretreat pump 40d. In some examples, gas processing system 10 also includes a first compressor 42a, a second compressor 42b, a third compressor 42c, a vacuum pump 42d, and a blower 42e. The various pumps, compressors, absorbers, flash tanks, etc., are interconnected by way of a methane supply line 44, a methane transfer line 46, a main solvent circuit 48, a pretreatment solvent circuit 50, and a gas circuit 52.

Methane supply line 44 conveys contaminated methane 14 from landfill 16 to a preabsorber gas inlet 54 of preabsorber 22. In methane supply line 44, methane 14 from landfill 16 flows sequentially through first compressor 42a, second compressor 42b, a first cooler 56, third compressor 42c and a second cooler 58. From second cooler 58, the methane gas 14 enters preabsorber 22 through preabsorber gas inlet 54. To provide first stage decontamination, methane 14 and its contaminants flow generally upward through preabsorber 22 and exits at a preabsorber gas outlet 62. Methane transfer line 46 conveys the now-cleaner, more concentrated methane 14 to a main absorber gas inlet 64 of main absorber 24. To provide second or final stage decontamination, methane 14 flows generally upward through main absorber 24 and exits through a main absorber outlet 66. A methane outlet line 68 conveys the now-purified methane 12 from main absorber gas outlet 66 to either more compression (if desired), oxygen removal and dehydration (if desired), or some product distribution line where the purified methane 12 can be sold and used for various useful purposes.

Figure 2:
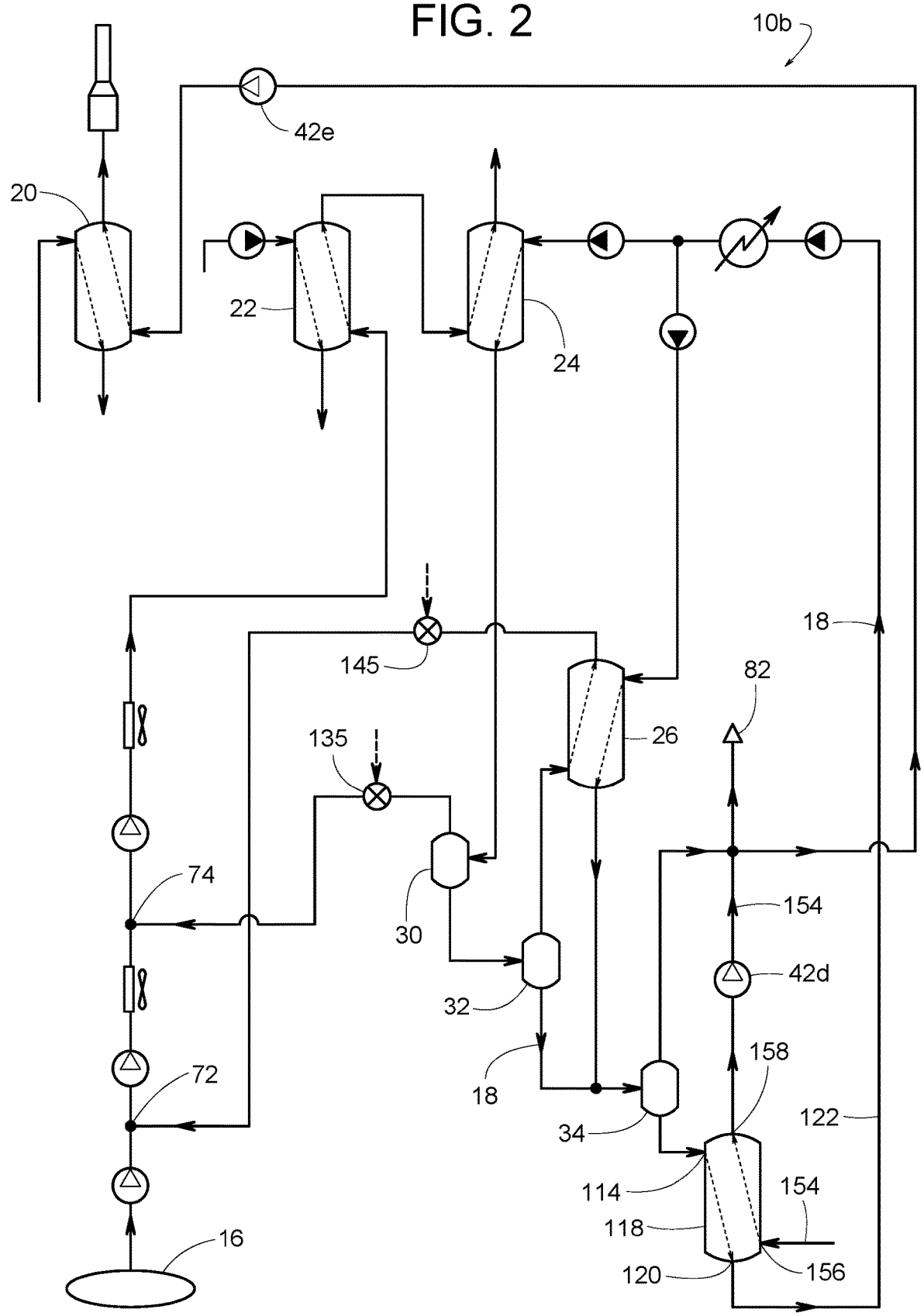
FIG. 2 is a schematic diagram of another example gas processing system constructed in accordance with the teachings disclosed herein.
Figure 3:
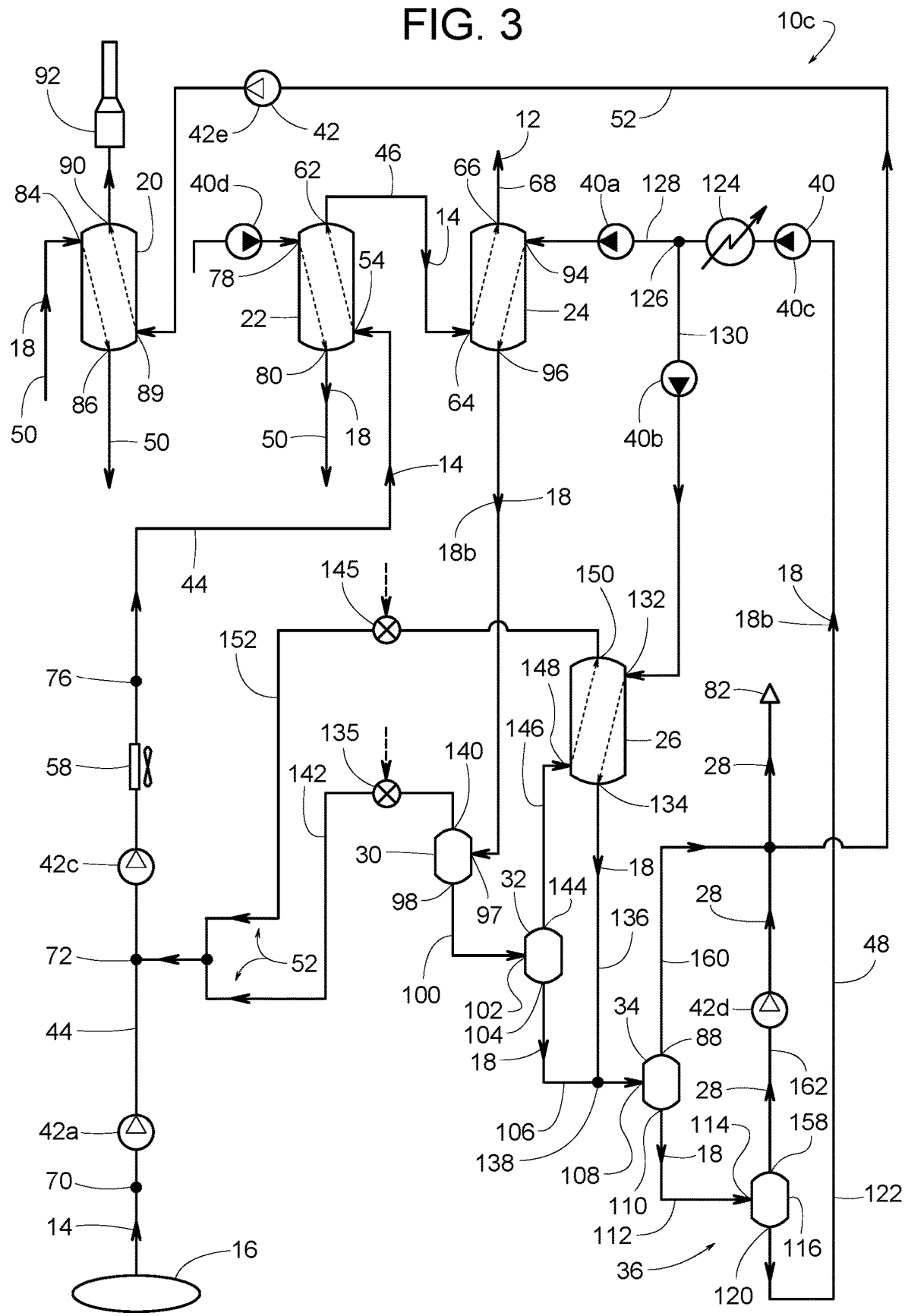
FIG. 3 is a schematic diagram of another example gas processing system constructed in accordance with the teachings disclosed herein.
Figure 4:
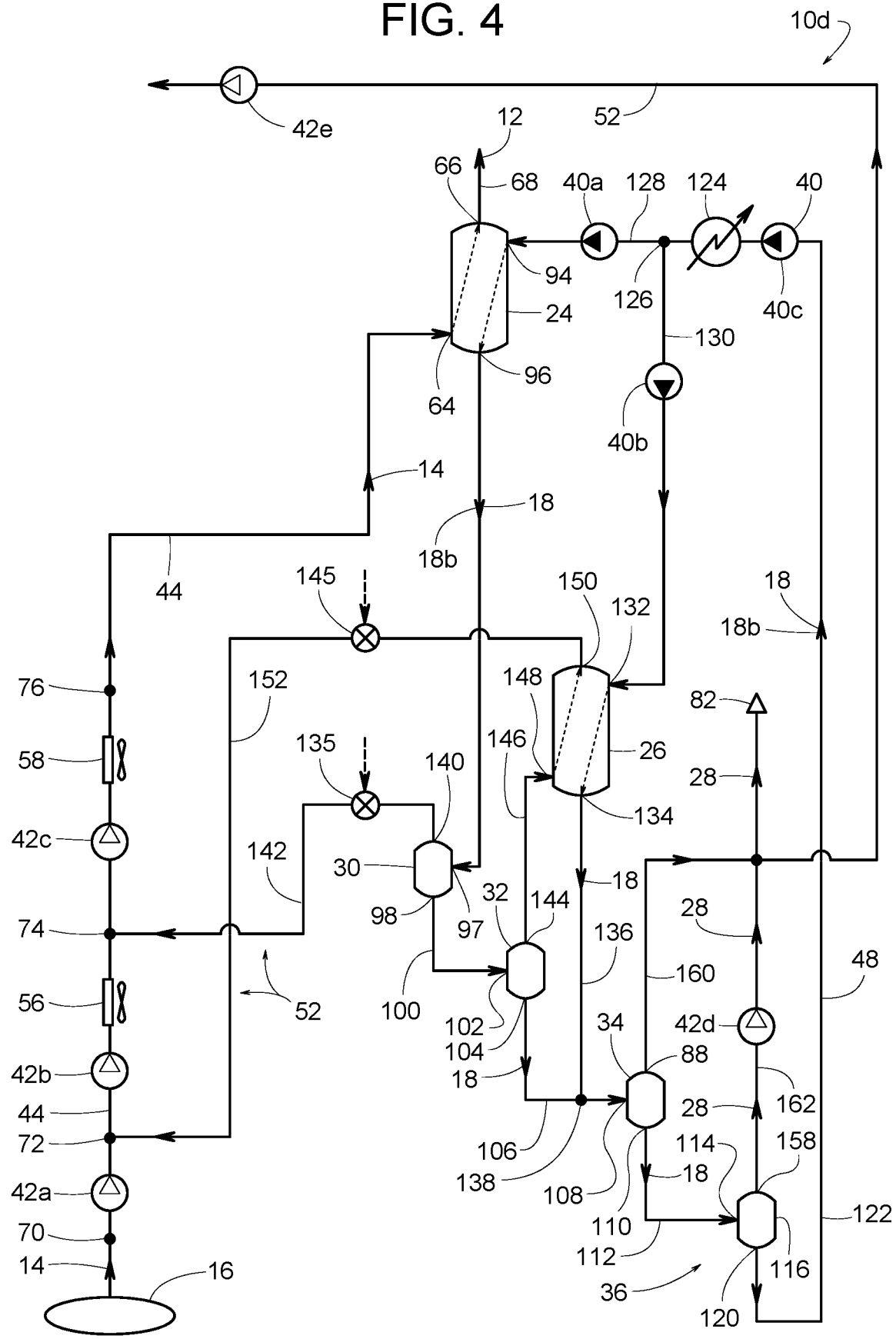
FIG. 4 is a schematic diagram of another example gas processing system constructed in accordance with the teachings disclosed herein.

In some examples (depending on desired treating pressures and compression setup), compressors 42a, 42b and 42c and coolers 56 and 58 alter the temperature and pressure of methane 14 along methane supply line 44 to provide an effective methane purification process. FIGS. 1, 2 and 4 show examples with three compressors 42a, 42b and 42c on the methane line 44, while FIG. 3 shows an example with two compressors 42a and 42c on the methane line 44. In some examples, first compressor 42a and/or an additional vacuum blower places a point 70 of methane supply line 44 at a slight vacuum to draw contaminated methane gas 14 from a gas collection tank of landfill 16. The discharge of first compressor 42a brings a first gas juncture 72 of methane supply line 44 to about 80 psig (i.e., between 60 and 120 psig). The term, "juncture" refers to any structure or combination of structures (e.g., pipes, T-fitting, combination of pipes and tanks, etc.) that receives multiple upstream currents and directs them into a single downstream current.

In some examples (e.g., FIGS. 1, 2 and 4), second compressor 42b and cooler 56 bring the condition of methane gas 14 at a second gas juncture 74 of methane supply line 44 to about 120 degrees Fahrenheit and about 200 psig (i.e., between 185 to 215 psig). Third compressor 42c and cooler 58 bring the condition of methane gas 14 at another point 76 of methane supply line 44 to about 120 degrees Fahrenheit and about 450 psig (i.e., between 200 and 700 psig). It is the discharge pressure of compressor 42c that generally determines the main absorber pressure at which main absorber 24 operates and the preabsorber pressure at which preabsorber 22 operates. The pressure within preabsorber 22, methane transfer line 46 and main absorber 24 are substantially the same at about 450 psig (i.e., between 200 and 700 psig). The discharge pressure at main absorber gas outlet 66 and methane outlet line 68 is also at about 450 psig (i.e., between 200 and 700 psig).

In some examples (e.g., FIGS. 1, 2 and 3), fourth pump 40d of pretreatment solvent circuit 50 forces solvent 18 (18a) through preabsorber 22 and pretreatment stripper 20. In some examples, solvent 18 discharged from fourth pump 40d enters preabsorber 22 at a preabsorber solvent inlet 78 and then flows generally downward through preabsorber 22. While flowing generally downward through preabsorber 22, liquid solvent 18 flows in intimate contact with the generally upward current of contaminated methane 14. The intimate contact enables solvent 18 to draw trace amounts of carbon dioxide 28 and most other impurities from methane 14, thereby slightly increasing the concentration of methane 14 exiting preabsorber 22.

After solvent 18 absorbs trace amounts of carbon dioxide 28 and other impurities from methane 14, solvent 18 exits preabsorber 22 through a preabsorber solvent outlet 80. From preabsorber solvent outlet 80, solvent 18, in some examples, is directed to a known pretreatment flash drum where carbon dioxide 28 flashes from solvent 18.

In some examples, the flash gas from the pretreatment flash drum goes to an incinerator 92. The gas stream directed to the incinerator 92, in some examples, comprises about 79% carbon dioxide, about 20% methane, and the remainder is heavier hydrocarbons, aromatics, VOCs (volatile organic compounds), and sulfur bearing species. The carbon dioxide in this stream is generally a nuisance as it increases the rate at which fuel gas is consumed in the incinerator 92 but is considered generally unavoidable. The small amount of methane in the stream partially offsets the amount of fuel gas required by the incinerator 92.

The remaining solvent 18 flows from the known pretreatment flash drum to a pretreatment solvent inlet 84 of pretreatment stripper 20. From pretreatment solvent inlet 84, solvent 18 flows generally downward through pretreatment stripper 20 and exits through a pretreatment solvent outlet 86. Solvent 18 flows from pretreatment solvent outlet 86 to the inlet of fourth pump 40d to perpetuate the solvent cycle of pretreatment solvent circuit 50.

In some examples, fifth blower 42e draws carbon dioxide 28 with traces of methane 14 from a third gas outlet 88 of third flash tank 34. From third gas line 160, fifth blower 42e forces the carbon dioxide 28 with traces of methane 14 into a gas inlet 89 and up through pretreatment stripper 20. While in pretreatment stripper 20, an upward flowing current of carbon dioxide 28 with some waste methane 14 is in intimate contact with downward flowing solvent 18. The intimate contact enables solvent 18 to draw problematic trace impurities from the upward-flowing gas stream, thereby reducing problematic trace components of waste methane 14. The gas stream with its waste methane 14 exits pretreatment stripper 20 out through a pretreatment gas outlet 90 and is burned in an incinerator 92.

While the solvent 18a in pretreatment solvent circuit 50 helps purify methane 14 in preabsorber 22, solvent 18b removes much of the carbon dioxide 28 and other impurities from the methane 14 flowing through main absorber 24. Additionally, solvent 18b flowing generally downward through intermediate absorber 26 removes a significant amount of carbon dioxide 28 from the gas stream flowing upward through the intermediate absorber 26. Thus, the generally upward flowing gas stream, which contains a small amount of methane 12, has less carbon dioxide 28 in it. With less carbon dioxide 28, there is less gas for compressor 42b and/or 42c to compress for reclaiming that small yet important amount of methane 12.

In the illustrated examples, the main pump 40a of main solvent circuit 48 delivers solvent 18 (solvent 18b) to a main absorber solvent inlet 94 of main absorber 24. In some examples, the discharge pressure of main pump 40a is about 450 psig (i.e., 200 to 700 psig). After entering main absorber 24 through main absorber solvent inlet 94, solvent 18 flows generally downward through main absorber 24 and then exits through a main absorber solvent outlet 96. Upon exiting main absorber 24, solvent 18 flows sequentially through a first liquid inlet 97 of first flash tank 30, through first flash tank 30, out through a first liquid outlet 98 of first flash tank 30, through a first liquid line 100, into second flash tank 32 via a second liquid inlet 102, through second flash tank 32, out through a second liquid outlet 104 of second flash tank 32, through a second liquid line 106, into third flash tank 34 via a third liquid inlet 108, through third flash tank 34, out through a third liquid outlet 110 of third flash tank 34, through a third liquid line 112, into a fourth liquid inlet 114 of vacuum circuit 36, through either vacuum flash tank 116 (FIGS. 1, 3 and 4) or through an air stripper tower 118 (FIG. 2), out through a fourth liquid outlet 120, through a fourth liquid line 122, to a suction side of booster pump 40c, through a refrigerant charged solvent chiller 124, and to a main solvent splitter 126. The term, "splitter" refers to any structure or combination of structures (e.g., pipes, T-fitting, combination of pipes and tanks, etc.) that receives an upstream current and directs it into multiple downstream currents. (e.g., a T-fitting, a tank, an arrangement of pipes and fittings, etc.).

Solvent splitter 126 divides the incoming solvent 28 discharged by booster pump 40c into two solvent streams. One solvent stream goes through a primary solvent supply line 128 to the suction side of main pump 40a, and the other solvent stream goes through a secondary solvent supply line 130 to the suction side of secondary pump 40b.

Solvent 18 (solvent 18b) discharged by secondary pump 40b enters intermediate absorber 26 via an intermediate absorber solvent inlet 132. Solvent 18 flows generally downward through intermediate absorber 26 from intermediate absorber solvent inlet 132 to an intermediate absorber solvent outlet 134, whereby solvent 18 removes a large portion of the carbon dioxide 28 while only absorbing a trace of methane 12. Upon exiting intermediate absorber 26 through intermediate absorber solvent outlet 134, solvent 18 flows through a secondary solvent return line 136 to a solvent juncture 138 (e.g., a T-fitting, a tank, an arrangement of pipes and fittings, etc.) At solvent juncture 138, solvent 18 from intermediate absorber 26 joins with solvent 18 from second flash tank 32, and the two solvent streams enter third flash tank 34.

To refresh solvent 18 flowing through main solvent circuit 48, carbon dioxide 28, some methane 14, and various impurities flash from solvent 18 in flash tanks 30, 32, 34 and 116. Flashing, for instance, occurs due to the pressure of solvent 18 suddenly dropping from about 450 psig in main absorber 24 to about 200 psig (i.e., 185 to 215 psig) in first flash tank 30.

First flash tank 30 releases flashed carbon dioxide 28 with methane 14 through a first gas outlet 140. Depending on compression layout, a first gas line 142 directs carbon dioxide 28 and methane 14 released by first flash tank 30 to the second gas juncture 74 of methane supply line 44. A control valve 135 (e.g., a pressure regulator, a pressure relief valve, a metering valve, etc.) in first gas line 142 regulates the pressure in first flash tank 30 by controllably restricting the amount of gas flowing through the first gas line 142. In the examples shown in FIGS. 1, 2 and 4, the discharge pressure of second compressor 42b is what generally determines the minimum allowable pressure in first flash tank 30. In the example shown in FIG. 3, the discharge pressure of first compressor 42a is what generally determines the minimum allowable pressure in first flash tank 30.

At second gas juncture 74 (e.g., FIGS. 1, 2, and 4), carbon dioxide 28 and methane 14 join the methane gas stream flowing from first cooler 56 to the suction side of third compressor 42c, depending on compression layout. The methane 14 can thus be reclaimed by passing once again through preabsorber 22 and/or main absorber 24.

Flashing also occurs in second flash tank 32 due to the pressure of solvent 18 suddenly dropping from about 200 psig (i.e., 185 to 215 psig) in first flash tank 30 to about 100 psig (i.e., 80 to 120 psig) in second flash tank 32. A control valve 145 (e.g., a pressure regulator, a pressure relief valve, a metering valve, etc.) in a second gas line 152 regulates the pressure in second flash tank 32 by controllably restricting the amount of gas flowing through the second gas line 152. In the examples shown in FIGS. 1-4, the discharge pressure of first compressor 42a is what generally determines the minimum allowable pressure in second flash tank 32.

Second flash tank 32 releases flashed carbon dioxide 28 and methane 14 through a second gas outlet 144. An intermediate gas line 146 directs carbon dioxide 28 and methane 14 released by second flash tank 32 to an intermediate gas inlet 148 of intermediate absorber 26. The pressure in second flash tank 32 is what generally determines the intermediate absorber pressure at which intermediate absorber 26 operates.

Carbon dioxide gas 28 and methane 14 flows generally upward through intermediate absorber 26 from intermediate gas inlet 148 to an intermediate gas outlet 150. From intermediate gas outlet 150, carbon dioxide 28 and methane 14 flows through the second gas line 152 to enter methane supply line 44 at first gas juncture 72 (e.g., a T-fitting, a tank, an arrangement of pipes and fittings, etc.). At first gas juncture 72, carbon dioxide 28 and methane 14 joins the methane gas stream flowing to the suction side of second compressor 42b. The methane 14 from second gas line 152 can thus be reclaimed by passing once again through preabsorber 22 and/or main absorber 24.

As carbon dioxide 28 and methane 14 flows upward through intermediate absorber 26, it comes in intimate contact with solvent 18 flowing generally downward from intermediate absorber solvent inlet 132 to intermediate absorber solvent outlet 134. The intimate contact within intermediate absorber 26 enables solvent 18 to absorb some of the carbon dioxide 28 from the upward flowing gas stream and thereby increases the gas stream's concentration of methane 14. The resulting gas stream, now with a higher concentration of methane 14 (and thus less carbon dioxide 28 to recompress), exits intermediate absorber 26 and enters second gas line 152.

In some examples, the use of intermediate absorber 26 and second flash tank 32 enables gas processing system 10 to reduce overall methane losses from about 3% to less than 1%, and this can be achieved with negligible additional compression horsepower. While it is possible to eliminate intermediate absorber 26 and instead have the second gas outlet 144 piped directly to second gas line 152, thereby bypassing intermediate absorber 26, doing so would mean having to recompress all the carbon dioxide that intermediate absorber 26 could otherwise remove. Thus, the energy consumed by compressor 42b and/or 42c is significantly lower with the use of intermediate absorber 26.

Flashing also occurs in third flash tank 34 due to the pressure of solvent 18 suddenly dropping from about 100 psig in second liquid line 106 to about zero psig (i.e., slightly above atmospheric pressure) in third flash tank 34. Third flash tank 34 releases flashed carbon dioxide 28 through third gas outlet 88 to atmospheric vent 82 and/or to the pretreat stripper 20. Remaining solvent 18 exits third flash tank 34 through third liquid outlet 110. Third liquid line 112 conveys solvent 18 from third liquid outlet 110 to fourth liquid inlet 114 of vacuum system 36. In the example shown in FIG. 1, fourth liquid inlet 114 is on vacuum flash tank 116. In the example shown in FIG. 2, fourth liquid inlet 114 is on air stripper tower 118.

Flashing occurs in fourth flash tank 116 due to the pressure of solvent 18 suddenly dropping from about zero psig in third liquid line 112 to about negative 12 psig (i.e., one psia to 5 psia). Fourth flash tank 116 releases flashed carbon dioxide 28 through a fourth gas outlet 158 then through a fourth gas line 162. Fourth gas line 162 conveys the flashed carbon dioxide 28 to a suction side of vacuum pump 42d, which discharges the carbon dioxide either through third gas line 160 to the pretreat stripper 20 or through atmospheric vent 82. Remaining solvent 18 exits fourth flash tank 116 through fourth liquid outlet 120. Fourth liquid line 122 conveys solvent 18 from fourth liquid outlet 120 to a suction side of booster pump 40c.

In the example shown in FIG. 2, gas processing system 10b includes air stripper tower 118 instead of vacuum flash tank 116. In the example of FIG. 2, air 154 (or nitrogen) enters an air inlet 156 of air stripper tower 118. From air inlet 156, air 154 flows generally upward through air stripper tower 118 to fourth gas outlet 158. In some examples, vacuum pump 42d draws the current of air 154 up through air stripper tower 118 and discharges air 154 to atmospheric vent 82. Within air stripper tower 118, the current of air 154 is in intimate contact with solvent 18. Air 154 being in intimate contact with solvent 18 draws carbon dioxide 28 and other impurities from solvent 18 before fourth liquid line 122 returns solvent 18 back to main absorber 24 and intermediate absorber 26.

In the example shown in FIG. 3, gas processing system 10c has both gas lines 142 and 152 being connected to the same effective point (e.g., the first gas juncture 72) on the methane supply line 44. In this example, the second compressor 42b is eliminated, and the third compressor 42c increases the gas pressure in methane supply line 44 from about 80 psig (i.e., between 60 and 120 psig) at the first gas juncture 72 to about 450 psig (i.e., between 200 and 700 psig) at point 76 on the methane supply line 44.

In the example shown in FIG. 4, gas processing system 10d eliminates the pretreat stripper 20 and the preabsorber 22. In this example, the methane supply line 44 connects directly to the main absorber gas inlet 64. While gas processing system 10d is shown having three compressors 42a, 42b and 42c, in some examples, gas processing system 10d has a compressor arrangement similar to that of gas processing system 10c of FIG. 3. Thus, in some examples, gas processing system 10d includes compressors 42a and 42c without compressor 42b.

It should also be noted that each of gas processing systems 10a, 10b, 10c and 10d can configured to include the vacuum flash tank 116 without the air stripper tower 118 (e.g., FIGS. 1, 3 and 4), or configured to include the air stripper tower 118 without the vacuum flash tank 116 (e.g., FIG. 2).

It should be noted that carbon dioxide gas, as used herein, refers to any gas or gas mixture containing at least some carbon dioxide. In some examples, the carbon dioxide gas includes some methane but contains more carbon dioxide than methane by total mass. Methane gas, as used herein refers to any gas or gas mixture containing at least some methane. In some examples, the methane gas includes some carbon dioxide but contains more methane than carbon dioxide by total mass.

The unit, "psia" refers to absolute pressure in pounds per square inch with a value of zero psia representing a perfect vacuum. The unit "psig" refers to gage pressure in pounds per square inch with a value of zero psig representing standard atmospheric pressure.

In some examples, gas circuit 52 comprises first gas line 142, second gas line 152, third gas line 160, fourth gas line 162, intermediate gas line 146, control valves 135 and 145, and one or more vents 82. Venting to atmosphere refers to a gas being released either directly to atmosphere or through a carbon filter. The term, "atmosphere" refers generally to the surrounding ambient air at standard atmospheric pressure (e.g., 14.7 psia).

It should be appreciated by those of ordinary skill in the art that the various flash tanks, absorbers and strippers disclosed herein may include various known float switches, drain valves, and/or control valves for controlling the tanks' outgoing flow of solvent. Examples of such float switches, drain valves, control valves and/or other details can be found in one or more of U.S. Pat. Nos. 9,580,369; 9,382,492; 9,340,739; 8,840,708; and 7,699,914; all of which are specifically incorporated by reference herein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. A gas processing system for separating a methane gas from a mixture of gases drawn from a landfill, wherein the mixture of gases includes at least the methane gas and a carbon dioxide gas, the gas processing system comprising:
a main solvent circuit conveying a main solvent;
a main absorber operating at a main absorber pressure, the main absorber including a main absorber gas inlet, a main absorber gas outlet, a main absorber solvent inlet, and a main absorber solvent outlet; the main absorber connecting the main absorber gas inlet in gas fluid communication with the main absorber gas outlet, the main absorber connecting the main absorber solvent inlet in liquid fluid communication with the main absorber solvent outlet, the main absorber placing the main solvent flowing from the main absorber solvent inlet to the main absorber solvent outlet in intimate contact with the methane gas flowing from the main absorber gas inlet to the main absorber gas outlet;
an intermediate absorber operating at an intermediate absorber pressure, the intermediate absorber including an intermediate absorber gas inlet, an intermediate absorber gas outlet, an intermediate absorber solvent inlet, and an intermediate absorber solvent outlet; the intermediate absorber connecting the intermediate absorber gas inlet in gas fluid communication with the intermediate absorber gas outlet, the intermediate absorber connecting the intermediate absorber solvent inlet in liquid fluid communication with the intermediate absorber solvent outlet, the intermediate absorber placing the main solvent flowing from the intermediate absorber solvent inlet to the intermediate absorber solvent outlet in intimate contact with the carbon dioxide gas flowing from the intermediate absorber gas inlet to the intermediate absorber gas outlet;
a first flash tank operating at a first pressure; the first flash tank including a first liquid inlet, a first liquid outlet and a first gas outlet;
a second flash tank operating at a second pressure; the second flash tank including a second liquid inlet, a second liquid outlet and a second gas outlet;
a third flash tank operating at a third pressure the; third flash tank including a third liquid inlet, a third liquid outlet and a third gas outlet;
a vacuum circuit operating at a subatmospheric pressure; the vacuum circuit including a fourth liquid inlet, a fourth liquid outlet, and a fourth gas outlet; the third pressure being greater than the subatmospheric pressure, the second pressure being greater than the third pressure, and the first pressure being greater than the second pressure;
a methane supply line connected to convey the mixture of gases between the landfill and the main absorber gas inlet;
a methane outlet line extending from the main absorber gas outlet;
a main solvent circuit including a primary solvent supply line, a primary solvent return line, a first liquid line, a second liquid line, a third liquid line, a fourth liquid line, a main solvent splitter, a secondary solvent supply line, and a secondary solvent return line;
the main solvent circuit being configured to convey the main solvent from the main solvent splitter and sequentially through the primary solvent supply line, the main absorber solvent inlet, the main absorber, the main absorber solvent outlet, the primary solvent return line, the first liquid inlet, the first flash tank, the first liquid outlet, the first liquid line, the second liquid inlet, the second flash tank, the second liquid outlet, the second liquid line, the third liquid inlet, the third flash tank, the third liquid line, the fourth liquid inlet, the fourth liquid outlet, and a fourth liquid line leading back to the main solvent splitter;
the main solvent circuit being further configured to convey the main solvent from the main solvent splitter and sequentially through the secondary solvent supply line, the intermediate absorber solvent inlet, the intermediate absorber, the intermediate absorber solvent outlet, the secondary solvent return line;
a solvent juncture connecting the secondary solvent return line from the intermediate absorber in fluid communication with the second liquid line from the second flash tank; and
a gas circuit including a first gas line, a second gas line, a third gas line, a fourth gas line, an intermediate gas line, and a vent; the first gas line being connected to convey the carbon dioxide gas from the first gas outlet to the methane supply line, the second gas line being connected to convey the carbon dioxide gas from the intermediate absorber gas outlet to the methane supply line, the third gas line being connected to convey the carbon dioxide gas from the third gas outlet, the fourth gas line being connected to convey the carbon dioxide gas from the fourth gas outlet, and the intermediate gas line being connected to convey the carbon dioxide gas from the second gas outlet to the intermediate gas inlet.

2. The gas processing system of claim 1, further comprising:
- a pretreatment solvent circuit conveying a pretreatment solvent;
- a preabsorber operating at a preabsorber pressure, the preabsorber including a preabsorber gas inlet, a preabsorber gas outlet, a preabsorber solvent inlet, and a preabsorber solvent outlet; the preabsorber connecting the preabsorber gas inlet in gas fluid communication with the preabsorber gas outlet, the preabsorber connecting the preabsorber solvent inlet in liquid fluid communication with the preabsorber solvent outlet, the preabsorber placing the pretreatment solvent flowing from the preabsorber solvent inlet to the preabsorber solvent outlet in intimate contact with the methane gas flowing from the preabsorber gas inlet to the preabsorber gas outlet, the methane supply line running from the landfill to the preabsorber gas inlet; and
- a methane transfer line running from the preabsorber gas outlet to the main absorber gas inlet.

3. The gas processing system of claim 1, wherein the intermediate gas line joins the methane supply line at a first gas juncture, the first gas line joins the methane supply line at a second gas juncture, and the first gas juncture is upstream of the second gas juncture with respect to a direction of methane gas flowing through the methane supply line.

4. The gas processing system of claim 3, wherein the first gas juncture is at a lower pressure than the second gas juncture.

5. The gas processing system of claim 3, further comprising:
- a first compressor on the methane supply line, wherein the first compressor, with reference to the direction of methane gas flowing through the methane supply line, is downstream of the first gas juncture and upstream of the second gas juncture; and
- a second compressor on the methane supply line, wherein the second compressor, with reference to the direction of methane gas flowing through the methane supply line, is downstream of the second gas juncture and upstream of the preabsorber gas inlet.

6. The gas processing system of claim 1, further comprising a vacuum pump on the fourth gas line, wherein the vacuum circuit includes a vacuum flash tank, and the vacuum flash tank includes the fourth liquid inlet, the fourth liquid outlet and the fourth gas outlet, and the vacuum pump forces the carbon dioxide gas from the vacuum flash tank and out through the vent.

7. The gas processing system of claim 1, further comprising a vacuum pump on the fourth gas line, wherein the vacuum circuit includes an air stripper tower, and the air stripper tower includes the fourth liquid inlet, the fourth liquid outlet, the fourth gas outlet, and an air inlet that directs air into the air stripper tower; the vacuum pump forces the air and the carbon dioxide gas from the air stripper tower.

8. The gas processing system of claim 1, further comprising:
- a main pump on the primary solvent supply line;
- a secondary pump on the secondary solvent supply line; and
- a booster pump that with reference to flow through the fourth liquid line is downstream of the fourth liquid outlet and upstream of the main solvent splitter.

9. The gas processing system of claim 1, wherein the intermediate absorber pressure is between 60 psig and 120 psig.

10. The gas processing system of claim 1, wherein the intermediate absorber pressure is substantially equal to the second pressure of the second flash tank.

11. A gas processing system for separating a methane gas from a mixture of gases drawn from a landfill, wherein the mixture of gases includes at least the methane gas and a carbon dioxide gas, the gas processing system comprising:
- a main solvent circuit conveying a main solvent;
- a pretreatment solvent circuit conveying a pretreatment solvent;
- a main absorber operating at a main absorber pressure, the main absorber including a main absorber gas inlet, a main absorber gas outlet, a main absorber solvent inlet, and a main absorber solvent outlet; the main absorber connecting the main absorber gas inlet in gas fluid communication with the main absorber gas outlet, the main absorber connecting the main absorber solvent inlet in liquid fluid communication with the main absorber solvent outlet, the main absorber placing the main solvent flowing from the main absorber solvent inlet to the main absorber solvent outlet in intimate contact with the methane gas flowing from the main absorber gas inlet to the main absorber gas outlet;
- a preabsorber operating at a preabsorber pressure, the preabsorber including a preabsorber gas inlet, a preabsorber gas outlet, a preabsorber solvent inlet, and a preabsorber solvent outlet; the preabsorber connecting the preabsorber gas inlet in gas fluid communication with the preabsorber gas outlet, the preabsorber connecting the preabsorber solvent inlet in liquid fluid communication with the preabsorber solvent outlet, the preabsorber placing the pretreatment solvent flowing from the preabsorber solvent inlet to the preabsorber solvent outlet in intimate contact with the methane gas flowing from the preabsorber gas inlet to the preabsorber gas outlet;
- an intermediate absorber operating at an intermediate absorber pressure, the intermediate absorber including an intermediate absorber gas inlet, an intermediate absorber gas outlet, an intermediate absorber solvent inlet, and an intermediate absorber solvent outlet; the intermediate absorber connecting the intermediate absorber gas inlet in gas fluid communication with the intermediate absorber gas outlet, the intermediate absorber connecting the intermediate absorber solvent inlet in liquid fluid communication with the intermediate absorber solvent outlet, the intermediate absorber placing the main solvent flowing from the intermediate absorber solvent inlet to the intermediate absorber solvent outlet in intimate contact with the methane gas flowing from the intermediate absorber gas inlet to the intermediate absorber gas outlet;
- a first flash tank operating at a first pressure; the first flash tank including a first liquid inlet, a first liquid outlet and a first gas outlet;
- a second flash tank operating at a second pressure; the second flash tank including a second liquid inlet, a second liquid outlet and a second gas outlet;

a third flash tank operating at a third pressure the; third flash tank including a third liquid inlet, a third liquid outlet and a third gas outlet;

a vacuum circuit operating at a subatmospheric pressure; the vacuum circuit including a fourth liquid inlet, a fourth liquid outlet, and a fourth gas outlet; the third pressure being greater than the subatmospheric pressure, the second pressure being greater than the third pressure, and the first pressure being greater than the second pressure;

a methane supply line running from the landfill to the preabsorber gas inlet;

a methane transfer line running from the preabsorber gas outlet to the main absorber gas inlet;

a methane outlet line extending from the main absorber gas outlet;

a main solvent circuit including a primary solvent supply line, a primary solvent return line, a first liquid line, a second liquid line, a third liquid line, a fourth liquid line, a main solvent splitter, a secondary solvent supply line, and a secondary solvent return line;

the main solvent circuit being configured to convey the main solvent from the main solvent splitter and sequentially through the primary solvent supply line, the main absorber solvent inlet, the main absorber, the main absorber solvent outlet, the primary solvent return line, the first liquid inlet, the first flash tank, the first liquid outlet, the first liquid line, the second liquid inlet, the second flash tank, the second liquid outlet, the second liquid line, the third liquid inlet, the third flash tank, the third liquid line, the fourth liquid inlet, the fourth liquid outlet, and a fourth liquid line leading back to the main solvent splitter;

the main solvent circuit being further configured to convey the main solvent from the main solvent splitter and sequentially through the secondary solvent supply line, the intermediate absorber solvent inlet, the intermediate absorber, the intermediate absorber solvent outlet, the secondary solvent return line;

a solvent juncture connecting the secondary solvent return line from the intermediate absorber in fluid communication with the second liquid line from the second flash tank; and a gas circuit including a first gas line, a second gas line, a third gas line, a fourth gas line, an intermediate gas line, and a vent; the first gas line being connected to convey the carbon dioxide gas from the first gas outlet to the methane supply line, the second gas line being connected to convey the carbon dioxide gas from the second gas outlet to the intermediate gas inlet, the third gas line being connected to convey the carbon dioxide gas from the third gas outlet toward the vent, the fourth gas line being connected to convey the carbon dioxide gas from the fourth gas outlet toward the vent, the intermediate gas line being connected to convey the carbon dioxide gas from the intermediate absorber gas outlet to the methane supply line.

12. A gas processing system for separating a methane gas from a mixture of gases drawn from a landfill, wherein the mixture of gases includes at least the methane gas and a carbon dioxide gas, the gas processing system comprising:

a main solvent circuit conveying a main solvent;

a pretreatment solvent circuit conveying a pretreatment solvent;

a main absorber operating at a main absorber pressure, the main absorber including a main absorber gas inlet, a main absorber gas outlet, a main absorber solvent inlet, and a main absorber solvent outlet; the main absorber connecting the main absorber gas inlet in gas fluid communication with the main absorber gas outlet, the main absorber connecting the main absorber solvent inlet in liquid fluid communication with the main absorber solvent outlet, the main absorber placing the main solvent flowing from the main absorber solvent inlet to the main absorber solvent outlet in intimate contact with the methane gas flowing from the main absorber gas inlet to the main absorber gas outlet;

a preabsorber operating at a preabsorber pressure, the preabsorber including a preabsorber gas inlet, a preabsorber gas outlet, a preabsorber solvent inlet, and a preabsorber solvent outlet; the preabsorber connecting the preabsorber gas inlet in gas fluid communication with the preabsorber gas outlet, the preabsorber connecting the preabsorber solvent inlet in liquid fluid communication with the preabsorber solvent outlet, the preabsorber placing the pretreatment solvent flowing from the preabsorber solvent inlet to the preabsorber solvent outlet in intimate contact with the methane gas flowing from the preabsorber gas inlet to the preabsorber gas outlet;

an intermediate absorber operating at an intermediate absorber pressure, the intermediate absorber including an intermediate absorber gas inlet, an intermediate absorber gas outlet, an intermediate absorber solvent inlet, and an intermediate absorber solvent outlet; the intermediate absorber connecting the intermediate absorber gas inlet in gas fluid communication with the intermediate absorber gas outlet, the intermediate absorber connecting the intermediate absorber solvent inlet in liquid fluid communication with the intermediate absorber solvent outlet, the intermediate absorber placing the main solvent flowing from the intermediate absorber solvent inlet to the intermediate absorber solvent outlet in intimate contact with the methane gas flowing from the intermediate absorber gas inlet to the intermediate absorber gas outlet;

a first flash tank operating at a first pressure; the first flash tank including a first liquid inlet, a first liquid outlet and a first gas outlet;

a second flash tank operating at a second pressure; the second flash tank including a second liquid inlet, a second liquid outlet and a second gas outlet;

a third flash tank operating at a third pressure the; third flash tank including a third liquid inlet, a third liquid outlet and a third gas outlet;

a vacuum circuit operating at a subatmospheric pressure; the vacuum circuit including a fourth liquid inlet, a fourth liquid outlet, and a fourth gas outlet; the third pressure being greater than the subatmospheric pressure, the second pressure being greater than the third pressure, and the first pressure being greater than the second pressure;

a methane supply line running from the landfill to the preabsorber gas inlet;

a methane transfer line running from the preabsorber gas outlet to the main absorber gas inlet;

a methane outlet line extending from the main absorber gas outlet;

a main solvent circuit including a primary solvent supply line, a primary solvent return line, a first liquid line, a second liquid line, a third liquid line, a fourth liquid line, a main solvent splitter, a secondary solvent supply line, and a secondary solvent return line;

the main solvent circuit being configured to convey the main solvent from the main solvent splitter and sequentially through the primary solvent supply line, the main absorber solvent inlet, the main absorber, the main absorber solvent outlet, the primary solvent return line, the first liquid inlet, the first flash tank, the first liquid outlet, the first liquid line, the second liquid inlet, the second flash tank, the second liquid outlet, the second liquid line, the third liquid inlet, the third flash tank, the third liquid line, the fourth liquid inlet, the fourth liquid outlet, and a fourth liquid line leading back to the main solvent splitter;

the main solvent circuit being further configured to convey the main solvent from the main solvent splitter and sequentially through the secondary solvent supply line, the intermediate absorber solvent inlet, the intermediate absorber, the intermediate absorber solvent outlet, the secondary solvent return line;

a solvent juncture connecting the secondary solvent return line from the intermediate absorber in fluid communication with the second liquid line from the second flash tank;

a gas circuit including a first gas line, a second gas line, a third gas line, a fourth gas line, an intermediate gas line, and a vent; the first gas line being connected to convey the carbon dioxide gas from the first gas outlet to the methane supply line, the second gas line being connected to convey the carbon dioxide gas from the second gas outlet to the intermediate gas inlet, the third gas line being connected to convey the carbon dioxide gas from the third gas outlet, the fourth gas line being connected to convey the carbon dioxide gas from the fourth gas outlet, the intermediate gas line being connected to convey the carbon dioxide gas from the intermediate absorber gas outlet to the methane supply line, the intermediate gas line joins the methane supply line at a first gas juncture, the first gas line joins the methane supply line at a second gas juncture, the first gas juncture is upstream of the second gas juncture with respect to a direction of methane gas flowing through the methane supply line, the first gas juncture is at a lower pressure than the second gas juncture;

a first compressor on the methane supply line, wherein the first compressor, with reference to the direction of methane gas flowing through the methane supply line, is downstream of the first gas juncture and upstream of the second gas juncture; and a second compressor on the methane supply line, wherein the second compressor, with reference to the direction of methane gas flowing through the methane supply line, is downstream of the second gas juncture and upstream of the preabsorber gas inlet.

13. The gas processing system of claim 12, further comprising a vacuum pump on the fourth gas line, wherein the vacuum circuit includes a vacuum flash tank, and the vacuum flash tank includes the fourth liquid inlet, the fourth liquid outlet and the fourth gas outlet, and the vacuum pump forces the carbon dioxide gas out from the vacuum flash tank.

14. The gas processing system of claim 12, further comprising a vacuum pump on the fourth gas line, wherein the vacuum circuit includes an air stripper tower, and the air stripper tower includes the fourth liquid inlet, the fourth liquid outlet, the fourth gas outlet, and an air inlet that directs air into the air stripper tower; the vacuum pump forces the air and the carbon dioxide gas out from the air stripper tower.

15. The gas processing system of claim 12, further comprising:
a main pump on the primary solvent supply line;
a secondary pump on the secondary solvent supply line; and
a booster pump that with reference to flow through the fourth liquid line is downstream of the fourth liquid outlet and upstream of the main solvent splitter.

16. The gas processing system of claim 12, wherein the intermediate absorber pressure is substantially equal to the second pressure of the second flash tank.

\* \* \* \* \*